US011846192B1

(12) United States Patent
Xie et al.

(10) Patent No.: US 11,846,192 B1
(45) Date of Patent: Dec. 19, 2023

(54) AIRFOIL ASSEMBLY WITH A TRUNNION AND SPAR

(71) Applicant: GENERAL ELECTRIC COMPANY, Schenectady, NY (US)

(72) Inventors: Ming Xie, Beavercreek, OH (US); Mitchell Harold Boyer, Cincinnati, OH (US); Tod Winton Davis, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/304,708

(22) Filed: Apr. 21, 2023

(51) Int. Cl.
   *F01D 5/30* (2006.01)
   *F01D 5/28* (2006.01)
   *F01D 5/32* (2006.01)

(52) U.S. Cl.
   CPC .......... *F01D 5/3023* (2013.01); *F01D 5/282* (2013.01); *F01D 5/32* (2013.01); *F05D 2230/60* (2013.01); *F05D 2260/37* (2013.01); *F05D 2300/603* (2013.01)

(58) Field of Classification Search
   CPC .......... F01D 5/3023; F01D 5/282; F01D 5/32; F05D 2230/60; F05D 2260/37; F05D 2300/603
   See application file for complete search history.

(56) References Cited

U.S. PATENT DOCUMENTS

| | | |
|---|---|---|
| 3,294,364 A | 12/1966 | Stanley |
| 3,752,600 A | 8/1973 | Walsh et al. |
| 4,111,606 A | 9/1978 | Prewo |
| 4,273,601 A | 6/1981 | Weingart |
| 4,363,602 A | 12/1982 | Martin |
| 4,802,824 A | 2/1989 | Gastebois et al. |
| 4,884,948 A * | 12/1989 | Sikorski ............ B64C 11/26 416/240 |
| 5,205,714 A | 4/1993 | Shah et al. |
| 5,403,153 A | 4/1995 | Goetze |
| 8,105,042 B2 | 1/2012 | Parkin et al. |
| 8,123,463 B2 | 2/2012 | Kray et al. |
| 8,419,374 B2 | 4/2013 | Huth et al. |
| 8,573,947 B2 | 11/2013 | Klinetob et al. |
| 8,696,319 B2 | 4/2014 | Naik |
| 9,162,750 B2 | 10/2015 | Coupe et al. |
| 9,771,810 B2 | 9/2017 | Marchal et al. |
| 9,828,861 B2 | 11/2017 | Le Hong |
| 10,519,776 B2 | 12/2019 | Berdou et al. |
| 10,619,493 B2 | 4/2020 | De Gaillard et al. |
| 10,774,660 B2 | 9/2020 | Luczak |
| 11,155,336 B2 | 10/2021 | Courtier |
| 11,459,908 B2 | 10/2022 | Decesare et al. |
| 2017/0058912 A1 | 3/2017 | De Gaillard et al. |
| 2018/0171806 A1 | 6/2018 | Freeman et al. |
| 2022/0403748 A1 | 12/2022 | Marchal et al. |

* cited by examiner

*Primary Examiner* — Jacob M Amick
*Assistant Examiner* — Charles J Brauch
(74) *Attorney, Agent, or Firm* — McGarry Bair PC

(57) ABSTRACT

An airfoil assembly and a method of forming the airfoil assembly, the airfoil assembly having a trunnion, a spar, and a set of inserts. The trunnion having a flared socket with an open top. The spar extending from the flared socket and through the open top. The spar having a first end located within the flared socket.

20 Claims, 5 Drawing Sheets

AIRFOIL ASSEMBLY WITH A TRUNNION AND SPAR

TECHNICAL FIELD

The disclosure generally relates to an airfoil assembly, and more specifically to an airfoil assembly having a trunnion and a spar.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotating sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

In some turbine engines, a variable pitch airfoil can be included, which can be selectively rotated to adjust or otherwise tailor the flow of fluid over the variable pitch airfoil. The variable pitch airfoil is movable through use of a trunnion and a spar. The trunnion can rotate about a rotational axis, which in turn rotates the spar and the variable pitch airfoil. The trunnion is coupled to or otherwise formed with the spar, and the airfoil is coupled to or otherwise formed with the spar

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
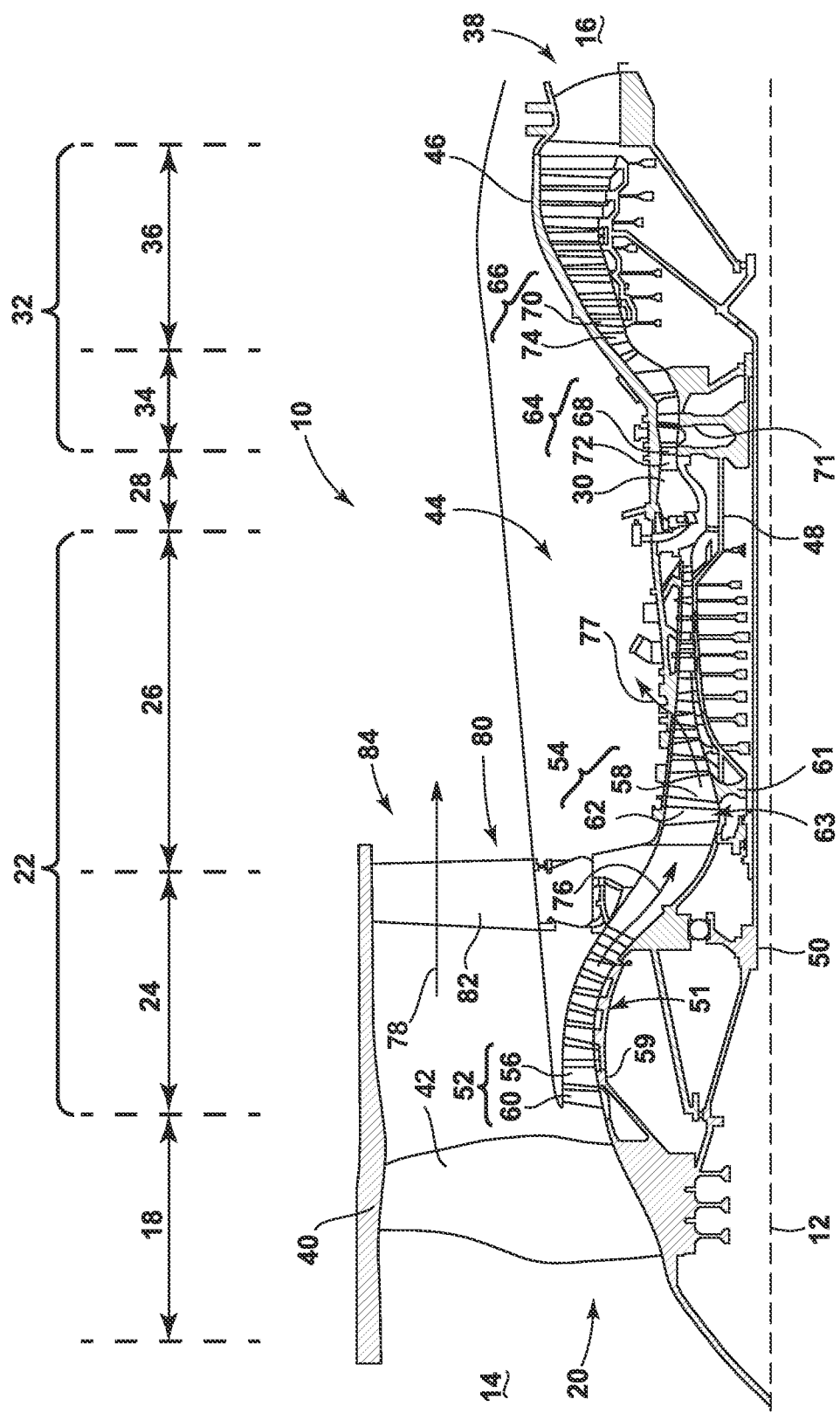
FIG. 1 is a schematic cross-sectional view of a turbine engine.

Aspects of the disclosure herein are directed to an airfoil assembly for a turbine engine. The airfoil assembly includes an airfoil, a spar, and a trunnion. The spar couples the airfoil to the trunnion. The spar having a furcated tail with a set of branches defining a set of intervening gaps. The airfoil assembly further includes a set of inserts provided within the set of intervening gaps.

For purposes of illustration, the present disclosure will be described with respect to an airfoil assembly for a turbine engine, specifically a fan blade of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked composite plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or cavity. The dry fibers can include prepreg, braided material, woven material, or any combination thereof.

Resin can be pumped into or otherwise provided to the mold or cavity to impregnate the dry fibers. The combination of the impregnated fibers and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers can be manual or automated.

The dry fibers can be contoured to shape the composite component or direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

"Preform" as used herein is a three-dimensional composite formed by a plurality of fibers including warp fibers and weft fibers. Additionally, at least one binder fibers that extends partially or fully through the preform in a direction perpendicular to both the warp and weft fibers. The at least one binder yarn can be integrated into the preform through weaving, stitching, or any appropriate manufacturing process.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30. The bleed air 77 can also be utilized by other systems.

A remaining portion of the airflow, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
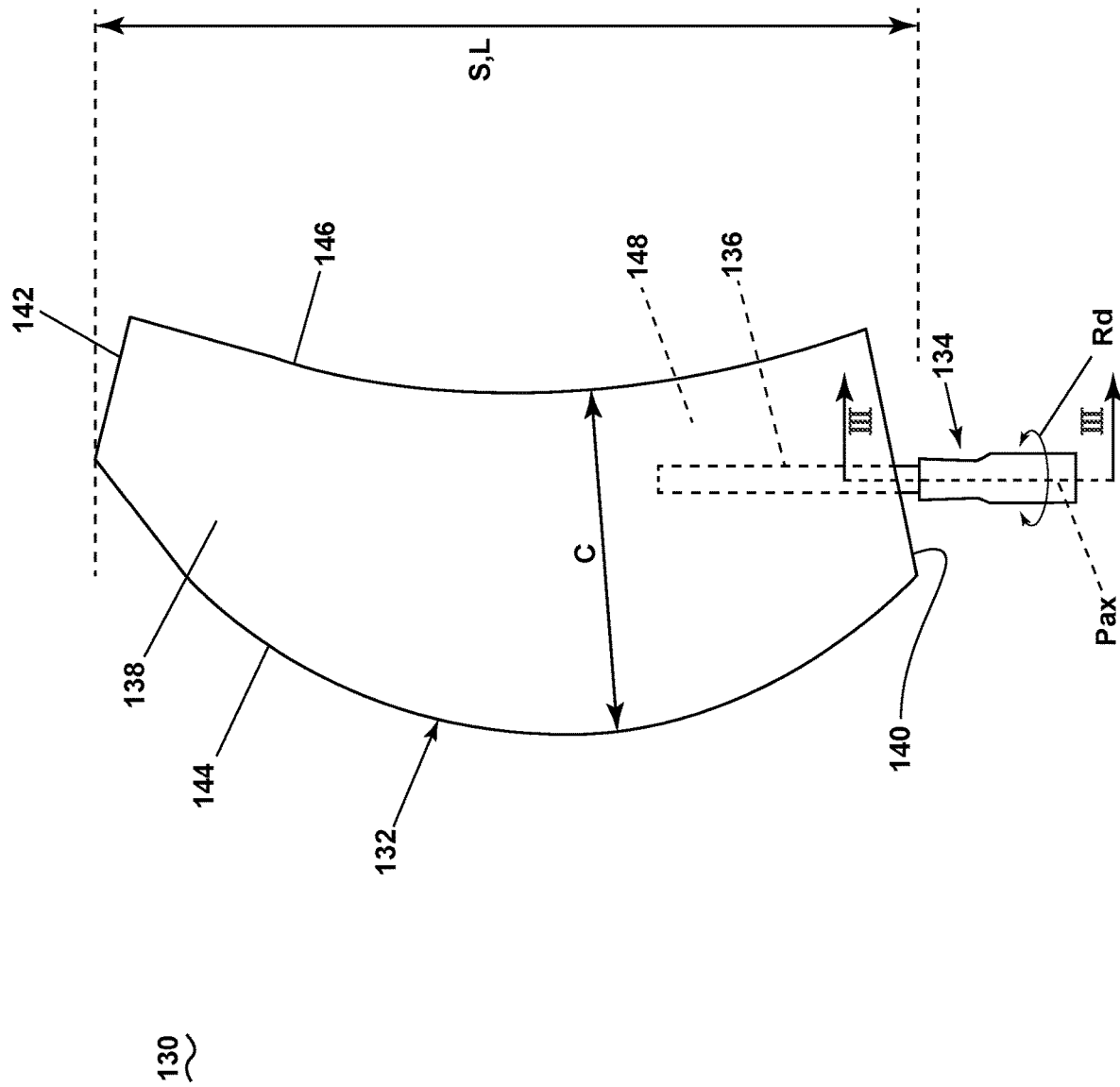
FIG. 2 is a schematic illustration of an airfoil assembly suitable for use within the turbine engine of FIG. 1, the airfoil assembly including an airfoil, a trunnion, and a spar.

FIG. 2 is schematic illustration of an airfoil assembly 130 suitable for use within the turbine engine 10 of FIG. 1. The airfoil assembly 130 can include an airfoil 132 that is any suitable airfoil of the turbine engine 10. As a non-limiting example, the airfoil 132 can be a blade of the plurality of fan blades 42, or a blade from the compressor blades 56, 58 or the turbine blades 68, 70. It is contemplated that the airfoil 132 can be a blade, vane, airfoil, or other component of any turbine engine, such as, but not limited to, a gas turbine engine, a turboprop engine, a turboshaft engine, a ducted turbofan engine, an unducted turbofan engine or an open rotor turbine engine.

The airfoil 132 can include a wall 138 bounding an interior 148. The wall 138 can extend between a leading edge 144 and a trailing edge 146 to define a chordwise direction (C). The wall 138 can further extend between a root 140 and a tip 142 to define a spanwise direction (S). The wall 138 can be a composite wall made of one or more layers of composite material. The one or more layers of material can be applied during the same stage or different stages of the manufacturing of the airfoil 132.

By way of non-limiting example, wall 138 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The airfoil assembly 130 can further include a spar 136 and a trunnion 134. The spar 136 can extend into the interior 148. The spar 136 can extend from the root 140. The spar 136 can be operably coupled to the trunnion 134. The spar 136 can be any suitable material such as, but not limited to, a composite material. The spar 136 can be a metal composite. The trunnion 134 can include any suitable material such as, but no limited to, a metallic material or a composite material. It will be appreciated that the term composite material can further include metals but with a composite architecture (e.g., a metal matrix composite). In the case of a composite material, the spar 136 and/or the trunnion 134 can be any suitable composite material such as a 2D or 3D composite, a laminate skin, a woven or a braided composite, or any other suitable composite. The spar 136 can further include a composite material with a bonding agent impregnated into the composite material. The spar 136 can then be cured to bond the composite material together.

The airfoil 132 has a span length (L) measured along the spanwise direction S from the root 140 at 0% the span length (L) to the tip 142 at 100% the span length (L). An entirety of the spar 136 can be located below 20% of the span length (L). Alternatively, the spar 136 can extend past 20% of the span length (L).

During operation of the airfoil assembly 130, the trunnion 134 can rotate about a pitch axis (Pax) in a rotational direction (Rd). As the spar 136 couples the trunnion 134 to the airfoil 132, rotation of the trunnion 134 in the rotational direction (Rd) causes the airfoil 132 to rotate about the pitch axis (Pax). This rotation can be used to control the pitch of the airfoil assembly 130 such that the airfoil assembly 130 is defined as a variable pitch airfoil assembly. The pitch of the airfoil assembly 130 can be varied based on the operation or intended operation of the turbine engine (e.g., the turbine engine 10 of FIG. 1) that the airfoil assembly 130 is provided on.

Figure 3:
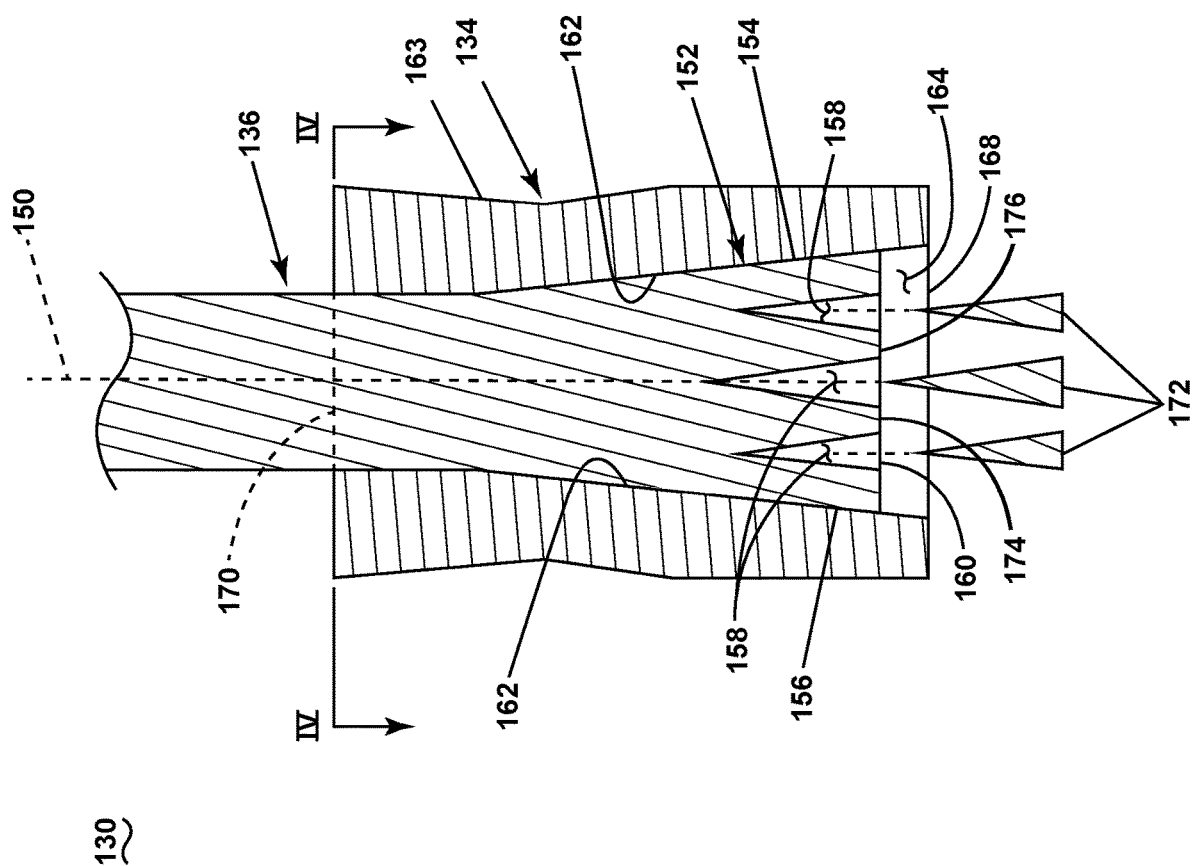
FIG. 3 is a schematic cross-sectional view of the airfoil assembly as seen from sectional line III-III of FIG. 2, further illustrating a furcated tail with a set of branches defining a set of intervening gaps, the airfoil assembly including a set of inserts receivable within the set of intervening gaps.

FIG. 3 is a schematic cross-sectional view of the airfoil assembly 130 as seen from sectional line III-III of FIG. 2. The airfoil 132 (FIG. 2) has been removed from the airfoil assembly 130 for illustrative purposes.

The trunnion 134 includes a wall 163 with an interior surface 162 at least a partially defining a flared socket 164 interior 148 of the trunnion 134. The flared socket 164 extends between an open top 170 and a bottom 168. The spar 136 extends through the open top 170 and into the interior 148. The bottom 168 can be an open bottom or a sealed/closed off bottom. The flared socket 164 can take any suitable shape with at least one flared cross section, as illustrated.

The spar extends along a centerline axis 150 and terminates at a first end 160 within the flared socket 164. The spar 136 includes a furcated tail 152 with a set of branches. As a non-limiting example, the set of branches include a first branch 154, a second branch 156, a third branch 174, and a fourth branch 176 that define a set of intervening gaps 158. The set of intervening gaps 158 extends axially into the spar 136. The set of intervening gaps 158 can extend any suitable distance into the spar 136. As a non-limiting example, the set of intervening gaps 158 can extend to an apex (e.g., a tip of each gap) that coincides with a location where the flared socket 164 begins to flare radially outward from the centerline axis 150. It is contemplated that a central intervening gap (e.g., a gap radially nearest the centerline axis 150) can extend axially farther than the other intervening gaps of the set of intervening gaps 158. The spar 136 can be symmetric or asymmetric about the centerline axis 150.

A set of inserts 172 are received within the set of intervening gaps 158. Each insert of the set of inserts 172 corresponds to a single intervening gap of the set of intervening gaps 158. The set of inserts 172 are shown as removed from the set of intervening gaps 158 for illustrative purposes only. The set of inserts 172 can include any suitable material such as, but not limited to, a composite material or a metallic material. As a non-limiting example, the set of inserts 172 can be the same or different material as the spar 136.

The set of inserts 172 are used to retain the spar 136 within the flared socket 164. This is done by using the set of inserts 172 to push the spar 136 radially outwards against the interior surface 162 such that the spar 136, is held in frictional contact with the trunnion 134. It will be further appreciated that the spar 136 can be retained within the trunnion 134 through any other suitable method such as, but not limited to, co-cured, adhesion, welding, bonding, fastening, or the like.

Figure 4:
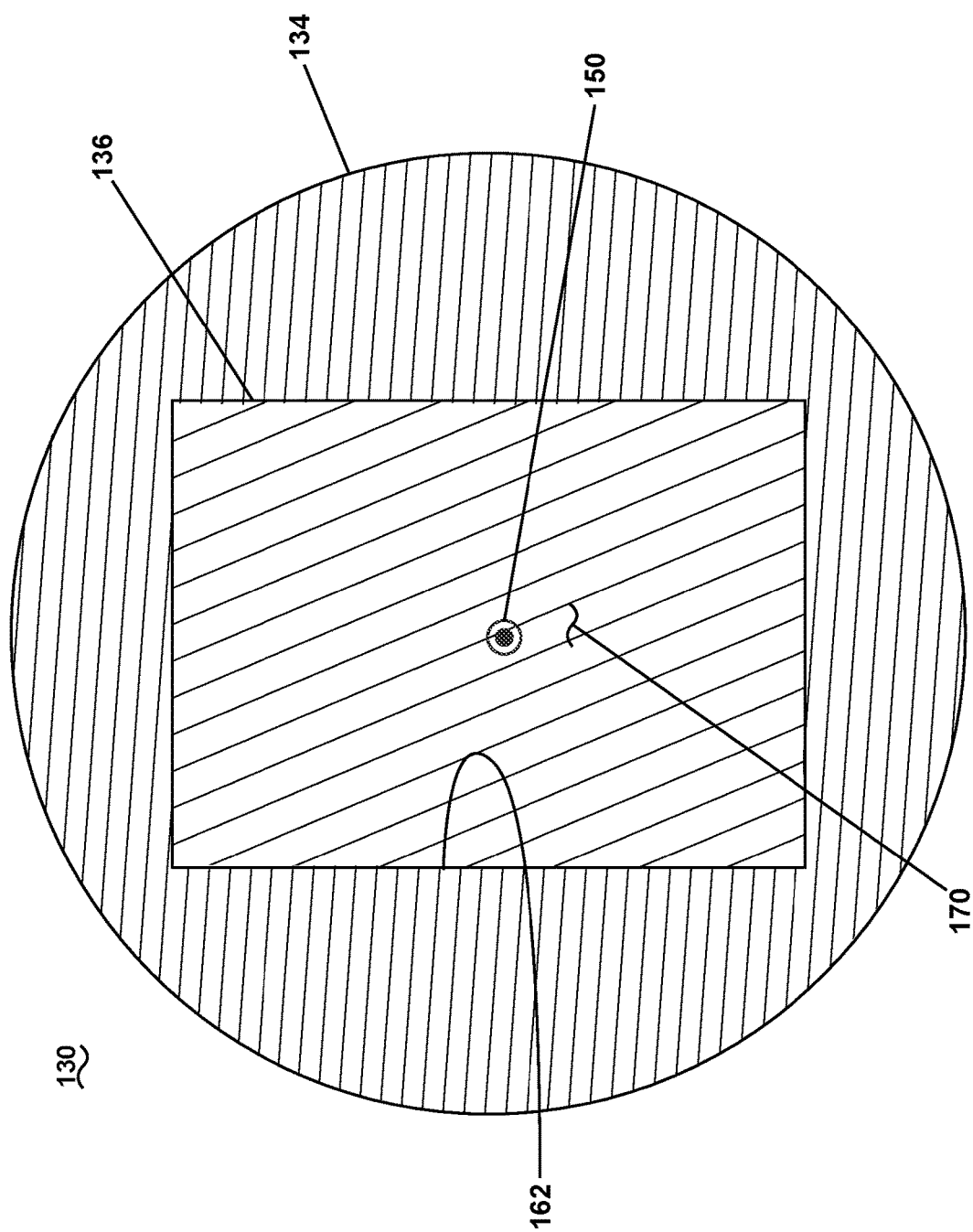
FIG. 4 is a schematic, top-down view of the airfoil assembly as seen from sectional line IV-IV of FIG. 3.

FIG. 4 is a schematic, top-down view of the airfoil assembly as seen from sectional line IV-IV of FIG. 3. As illustrated, the spar 136 can be polygonal (e.g., non-circular). As a non-liming example, the spar 136 can each include a rectangular cross section when cut along a horizontal plane that is perpendicular to the centerline axis 150. The open top 170 can have a corresponding cross section to the spar 136. As a non-liming example, the open top 170 can have a rectangular cross section when viewed along the horizontal plane. The rectangular cross section can be provided along an entirety of the flared socket 164. Alternatively, the cross section of the open top 170 can differ from the cross-section of the spar 136. Alternatively, the open top 170 can have any suitable non-rectangular cross section such as a circular cross section.

Figure 5:
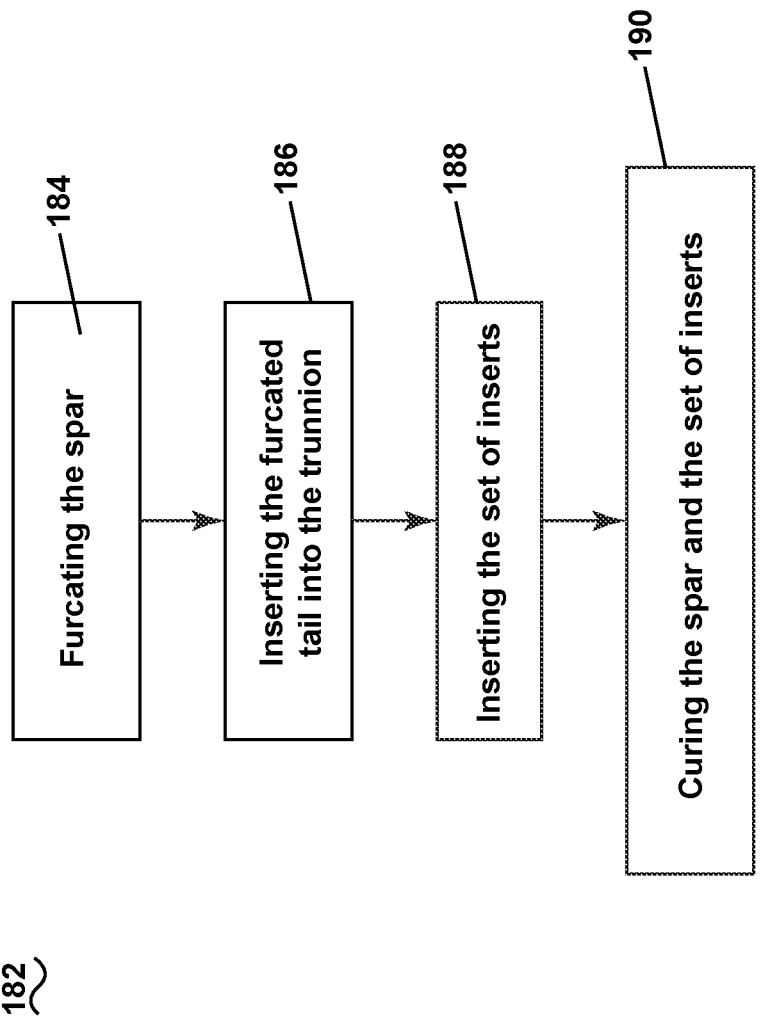
FIG. 5 is an exemplary method of forming the airfoil assembly of FIG. 2.

FIG. 5 is an exemplary method 182 of forming the airfoil assembly 130 of FIG. 3. Reference will be made FIGS. 2-5 by relating the method 182 to the physical aspects of the airfoil assembly outlined in FIGS. 2-4.

The method 182 can begin by furcating the spar 136 to produce the furcated tail 152, at 184. This can be done by physically cutting or machining the spar 136 or by forming the spar 136 to include the furcated tail 152. The spar 136, specifically at least the furcated tail 152, can be inserted into the trunnion 134, and more specifically, into the flared socket 164 of the trunnion 134, at 186. The spar 136 can be inserted through the open top 170. This can require bending or compressing the spar 136 radially inward towards the centerline axis 150 to ensure that the furcated tail 152 can fit through the open top 170. Once inserted, the furcated tail 152 can splay outwards and contact the interior surface 162. The set of inserts 172 can be placed within the trunnion 134, specifically within the set of intervening gaps 158, at 188. This can be done by inserting the set of inserts 172 through the bottom 168 of the trunnion 134. The spar 136, and the set of inserts 172 can then be cured together, at 190, such that the spar 136 and the set of inserts 172 form a unitary body.

It will be understood that the method 182 is flexible and the method 182 is illustrated merely for illustrative purposes. For example, the sequence of steps depicted is for illustrative purposes only, and is not meant to limit the method 182 in any way, as it is understood that the steps can proceed in a different logical order or additional or intervening steps can be included without detracting from embodiments of the invention. By way of non-limiting example, the curing step, at 190, can further including curing the trunnion 134, the spar 136, and the set of inserts 172 together such that the trunnion 134, the spar 136, and the set of inserts 172 form a unitary body.

The method 182 can further include forming the spar 136 as a 3D woven preform spar prior to or in tandem with furcating the spar 136, at 184. The method 182 can further include placing the spar 136 into the interior 148 of the airfoil 132. The spar 136 can be placed into the interior 148 of the airfoil 132 either before or after the steps described in the method 182. The method 182 can further include providing the airfoil assembly 130 within a portion of the turbine engine 10 (FIG. 1).

It is contemplated that the use of the 3D woven preform spar as opposed to a 2D spar can result in a turbine engine with increased efficiency. For example, the 2D spar can rely on hand laid plies or a combination of multiple woven or prefabricated preforms into one composite assembly. Hand layup or assembly of 2D preforms increases the labor and costs required to build the composite assembly. Assembly of 2D preforms also comes with assembly and positioning challenges. Moreover, a composite assembly formed from 2D plies or multiple preforms will be more likely to have limited interlaminar loading capability. Conversely, a 3D preform (e.g., the 3D woven preform spar) that is formed from a single woven preform, the complex and time-consuming process of combining multiple preforms, such as with the 2D spar, is not needed.

Benefits associated with the present disclosure include an airfoil assembly with a decreased burden of manufacture when compared to a conventional airfoil assembly. For example, the conventional airfoil assembly including a spar and trunnion requires additional structure to ensure that the airfoil of the conventional airfoil assembly is coupled to the trunnion. For example, the conventional airfoil assembly utilizes a laminated spar provided within a flared socket of a trunnion. Positioning the laminated spar within the flared socket such that the laminated spar is retained within the flared socket, however, requires a time-intensive and labor-intensive method of isolating certain portions of the laminated spar to couple the laminated spar to the trunnion. The conventional airfoil assembly can further require that the spar is physically coupled to or formed with the trunnion, which in turn can make assembling and disassembling (e.g., during maintenance) difficult. The airfoil assembly, as described herein, however, includes the spar, and the set of inserts that are cured together after assembly. This configuration of the airfoil assembly greatly reduces the complexity of the airfoil assembly with respect to the conventional airfoil assembly, which in turn greatly reduces the burden of manufacture.

For example, to the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An airfoil assembly for a turbine engine, the airfoil assembly comprising an airfoil comprising a wall bounding an interior and defining an exterior surface, the wall extending between a leading edge and a trailing edge to define a chordwise direction, and between a root and a tip to define a spanwise direction, a trunnion having a flared socket with an open top, a spar including a 3-dimensional preform, the spar extending from the flared socket, through the open top of the flared socket, and into the interior of the airfoil, the spar having a furcated tail with a set of branches defining a set of intervening gaps, with each gap of the set of intervening gaps being formed between adjacent branches of the set of branches, and set of inserts, with each insert of the set of inserts being received within a respective intervening gap of the set of intervening gaps, with the set of inserts being co-cured with the spar to define a unitary body.

A turbine engine comprising an airfoil assembly having an airfoil comprising a wall bounding an interior and defining an exterior surface, the wall extending between a leading edge and a trailing edge to define a chordwise direction, and between a root and a tip to define a spanwise direction, a trunnion having a flared socket with an open top, a spar including a 3-dimensional preform, the spar extending from the flared socket, through the open top of the flared socket, and into the interior of the airfoil, the spar having a furcated tail with a set of branches defining a set of intervening gaps, with each gap of the set of intervening gaps being formed between adjacent branches of the set of branches, and a set of inserts, with each insert of the set of inserts being received within a respective intervening gap of the set of intervening gaps, with the set of inserts being co-cured with the spar to define a unitary body.

A method of forming an airfoil assembly for a turbine engine, the airfoil assembly having a trunnion having a flared socket with an open top, and a spar, the method comprising furcating the spar such that the spar includes a furcated tail having a set of branches, with the set of branches defining a set of intervening gaps, with each gap of the set of intervening gaps being formed between adjacent branches of the set of branches, inserting at least the furcated tail of the spar into the trunnion, inserting a set of inserts into the set of intervening gaps, with each insert of the set of inserts corresponding to a respective intervening gap of the set of intervening gaps, and curing the spar and the set of inserts such that the spar and the set of inserts form a unitary body The airfoil assembly of any preceding clause, wherein the spar extends along a centerline axis and the furcated tail is symmetric about the centerline axis.

The airfoil assembly of any preceding clause, wherein the spar includes a composite material.

The airfoil assembly of any preceding clause, wherein the airfoil includes a composite material.

The airfoil assembly of any preceding clause, wherein the set of intervening gaps includes three or more intervening gaps.

The airfoil assembly of any preceding clause, wherein the spar extends along a centerline axis in the spanwise direction, and the flared socket includes a rectangular cross-sectional area when viewed along a horizontal plane that is perpendicular to the centerline axis.

The airfoil assembly of any preceding clause, wherein the spar includes a rectangular cross-sectional area when viewed along the horizontal plane.

The airfoil assembly of any preceding clause, wherein the set of inserts include a metallic material or a composite material.

The airfoil assembly of any preceding clause, wherein the set of inserts, the spar, and the trunnion are co-cured with each other to form a unitary body.

The airfoil assembly of any preceding clause, wherein the turbine engine includes a fan section, a compressor section, a combustion section and a turbine section in serial flow arrangement with the airfoil assembly being provided within one of the fan section, the compressor section, or the turbine section of the turbine engine.

The method of any preceding clause, further comprising furcating the tail such that the tail is symmetric about a centerline axis extending along the spar.

The method of any preceding clause, further comprising curing the spar, the trunnion, and the set of inserts such that the spar, the trunnion and the set of inserts form a unitary body.

The method of any preceding clause, further comprising inserting the spar through the open top.

The method of any preceding clause, further comprising inserting the set of inserts through an open bottom, opposite the open top, of the flared socket.

The method of any preceding clause, further comprising forming the spar with a composite material.

The method of any preceding clause, further comprising forming the spar as a 3-dimensional preform.

The method of any preceding clause, further comprising providing the spar within an interior of an airfoil assembly having a wall bounding an interior and defining an exterior surface extending between a leading edge and a trailing edge to define a chordwise direction, and between a root and a tip to define a spanwise direction.

The method of any preceding clause, further comprising providing the airfoil assembly within a fan section, a compressor section or a turbine section of the turbine engine.

What is claimed is:

1. An airfoil assembly for a turbine engine, the airfoil assembly comprising:
   an airfoil comprising a wall bounding an interior and defining an exterior surface, the wall extending between a leading edge and a trailing edge to define a chordwise direction, and between a root and a tip to define a spanwise direction;
   a trunnion having a flared socket with an open top;
   a spar including a 3-dimensional preform, the spar extending from the flared socket, through the open top of the flared socket, and into the interior of the airfoil, the spar having a furcated tail with a set of branches defining a set of intervening gaps, with each gap of the set of intervening gaps being formed between adjacent branches of the set of branches; and
   a set of inserts, with each insert of the set of inserts being received within a respective intervening gap of the set of intervening gaps, with the set of inserts being co-cured with the spar to define a unitary body.

2. The airfoil assembly of claim 1, wherein the spar extends along a centerline axis and the furcated tail is symmetric about the centerline axis.

3. The airfoil assembly of claim 1, wherein the spar includes a composite material.

4. The airfoil assembly of claim 1, wherein the airfoil includes a composite material.

5. The airfoil assembly of claim 1, wherein the set of intervening gaps includes three or more intervening gaps.

6. The airfoil assembly of claim 1, wherein the spar extends along a centerline axis in the spanwise direction, and the flared socket includes a rectangular cross-sectional area when viewed along a horizontal plane that is perpendicular to the centerline axis.

7. The airfoil assembly of claim 6, wherein the spar includes a rectangular cross-sectional area when viewed along the horizontal plane.

8. The airfoil assembly of claim 1, wherein the set of inserts include a metallic material or a composite material.

9. The airfoil assembly of claim 1, wherein the set of inserts, the spar, and the trunnion are co-cured with each other to form a unitary body.

10. The airfoil assembly of claim 1, wherein the turbine engine includes a fan section, a compressor section, a combustion section and a turbine section in serial flow arrangement with the airfoil assembly being provided within one of the fan section, the compressor section, or the turbine section of the turbine engine.

11. A turbine engine comprising:
an airfoil assembly having:
an airfoil comprising a wall bounding an interior and defining an exterior surface, the wall extending between a leading edge and a trailing edge to define a chordwise direction, and between a root and a tip to define a spanwise direction;
a trunnion having a flared socket with an open top;
a spar including a 3-dimensional preform, the spar extending from the flared socket, through the open top of the flared socket, and into the interior of the airfoil, the spar having a furcated tail with a set of branches defining a set of intervening gaps, with each gap of the set of intervening gaps being formed between adjacent branches of the set of branches; and
a set of inserts, with each insert of the set of inserts being received within a respective intervening gap of the set of intervening gaps, with the set of inserts being co-cured with the spar to define a unitary body.

12. A method of forming an airfoil assembly for a turbine engine, the airfoil assembly having a trunnion having a flared socket with an open top, and a spar, the method comprising:
furcating the spar such that the spar includes a furcated tail having a set of branches, with the set of branches defining a set of intervening gaps, with each gap of the set of intervening gaps being formed between adjacent branches of the set of branches;
inserting at least the furcated tail of the spar into the trunnion;
inserting a set of inserts into the set of intervening gaps, with each insert of the set of inserts corresponding to a respective intervening gap of the set of intervening gaps; and
curing the spar and the set of inserts such that the spar and the set of inserts form a unitary body.

13. The method of claim 12, further comprising furcating the tail such that the tail is symmetric about a centerline axis extending along the spar.

14. The method of claim 12, further comprising curing the spar, the trunnion, and the set of inserts such that the spar, the trunnion and the set of inserts form a unitary body.

15. The method of claim 12, further comprising inserting the spar through the open top.

16. The method of claim 15, further comprising inserting the set of inserts through an open bottom, opposite the open top, of the flared socket.

17. The method of claim 12, further comprising forming the spar with a composite material.

18. The method of claim 17, further comprising forming the spar as a 3-dimensional preform.

19. The method of claim 12, further comprising providing the spar within an interior of an airfoil assembly having a wall bounding an interior and defining an exterior surface extending between a leading edge and a trailing edge to define a chordwise direction, and between a root and a tip to define a spanwise direction.

20. The method of claim 12, further comprising providing the airfoil assembly within a fan section, a compressor section or a turbine section of the turbine engine.

\* \* \* \* \*